United States Patent
Ryan et al.

(10) Patent No.: US 6,213,502 B1
(45) Date of Patent: Apr. 10, 2001

(54) AIR BAG MODULE WITH VARIABLE INFLATION

(75) Inventors: Shawn Gregory Ryan, Dayton, OH (US); James Lloyd Webber, Shelby Twp., Macomb County, MI (US); Allen Richard Starner, Springboro; Alex Scott Damman, Dublin, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/198,857

(22) Filed: Nov. 24, 1998

(51) Int. Cl.[7] .................................................. B60R 21/26
(52) U.S. Cl. ......................... 280/736; 280/739; 280/742
(58) Field of Search ................................... 280/736, 741, 280/742, 739

(56) References Cited

U.S. PATENT DOCUMENTS

| | | |
|---|---|---|
| 3,861,712 | 1/1975 | Marsui et al. . |
| 4,500,114 * | 2/1985 | Grey, Jr. ............................ 280/742 |
| 5,221,109 | 6/1993 | Marchant . |
| 5,280,953 * | 1/1994 | Wolanin et al. .................... 280/729 |
| 5,330,226 | 7/1994 | Gentry et al. . |
| 5,366,242 | 11/1994 | Faigle et al. . |
| 5,413,378 | 5/1995 | Steffens, Jr. et al. . |
| 5,664,802 | 9/1997 | Harris et al. . |
| 5,695,214 | 12/1997 | Faigle et al. . |
| 5,707,078 | 1/1998 | Swanberg et al. . |
| 5,709,405 | 1/1998 | Saderholm et al. . |
| 5,743,558 * | 4/1998 | Seymour ............................ 280/739 |
| 6,039,346 * | 3/2000 | Ryan et al. ........................ 280/736 |

FOREIGN PATENT DOCUMENTS

| | | |
|---|---|---|
| 19704501 | 8/1997 | (DE) . |
| 19754280 | 7/1998 | (DE) . |
| 0694442 | 1/1996 | (EP) . |
| 800967 | 10/1997 | (EP) . |
| 2306409 | 5/1997 | (GB) . |
| 3-32957 | 2/1991 | (JP) . |
| 9831570 | 7/1998 | (WO) . |

* cited by examiner

*Primary Examiner*—Paul N. Dickson
*Assistant Examiner*—Faye M. Fleming
(74) *Attorney, Agent, or Firm*—Kathryn A. Marra

(57) ABSTRACT

An air bag module is provided for inflating an air bag cushion at variable rates in response to rapid deceleration of a motor vehicle. The air bag module includes an inflator for generating inflator gas to inflate an air bag cushion upon the sensing rapid deceleration of a vehicle. An annular cushion retainer is disposed about the inflator for directing gases from the inflator to the air bag cushion. The cushion retainer includes an annular cavity in fluid communication with the air bag cushion by a vent opening to selectively direct gas away from the air bag cushion during a reduced level of deployment. A controller generates an ignition signal to the inflator in response to velocity responsive sensors. In response to the ignition signals, the inflator releases an appropriate predetermined volume of gas into the air bag cushion. The level of deployment or inflation of the air bag cushion is dependent on the actuation of a slide actuator assembly arranged to selectively block the vent opening of the cushion retainer to restrict or block gas flow directed away from the air bag cushion to the exterior of the air bag module.

22 Claims, 4 Drawing Sheets

AIR BAG MODULE WITH VARIABLE INFLATION

TECHNICAL FIELD

The present invention relates generally to vehicle supplemental inflatable restraint systems and, more particularly, to an air bag module that provides variable output inflation of an air bag cushion from a single inflator.

BACKGROUND OF THE INVENTION

Driver side or passenger side supplemental inflatable restraint (SIR) systems typically include an air bag stored in a housing module within the interior of the vehicle in close proximity to either the driver or one or more passengers. SIR systems are designed to actuate upon sudden deceleration to rapidly deploy an air bag to restrain the movement of the driver or passengers. During deployment, gas is emitted rapidly from an inflator, which produces gas to expand the air bag cushion to a fully inflated state.

Known inflators for air bag cushions are generally of three types. One type is the pure gas inflator wherein a pressure vessel contains stored pressurized gas. The pressure vessel communicates with the cushion through various types of rupturable outlets or diaphragms. Another type is the gas generator wherein a propellant is ignited and the resultant gases flow through an outlet to the cushion. A third type is the hybrid or augmented type. This type includes a pressure vessel containing stored pressurized gas and a gas generator. When the generator is ignited, the resultant gas flows with the stored gas to the cushion through the pressure vessel outlet.

It is also known to inflate the cushion at a relatively low rate under low level deployment conditions, such as a sudden low level deceleration, and at a relatively high rate under high level deployment conditions, such as a sudden high level deceleration. This can be accomplished in a pure gas type inflator by providing the pressure vessel with an outlet of variable flow area. In addition, devices are known which provide primary inflation (reduced inflation) and full level inflation using a single gas vessel with two separate gas heaters. Primary inflation is accomplished by actuating the gas vessel and heating the gas at a specified reduced level. Full level inflation is accomplished by actuating a second separate heater located at the bottom of the gas vessel to heat the gas at a greater level. This second heater is deployed at the same time or a delayed time as the primary heater to provide full level inflation.

It is also known in the art to use a system having two discrete inflators to accomplish dual level inflation. In these types of systems, two discrete inflators are deployed at the same time or at a delayed time depending upon the severity of the sudden deceleration.

SUMMARY OF THE INVENTION

This invention offers advantages and alternatives over the prior art by providing an air bag module having a slide assembly for selectively directing the gas flow passing from an inflator away from an air bag cushion to provide different levels of air bag deployment. Advantageously, the air bag module includes a cushion retainer having a vent opening and annular cavity to provide a path directing gas flow away from the air bag cushion to reduce the level of deployment. The slide selectively restricts the gas exiting the air bag module through the vent opening of the cushion retainer and arcuate slots in an adapter plate to provide a simple means of varying the level of deployment of the air bag cushion.

These and other advantages are accomplished in a preferred form of the invention by providing an air bag module that provides variable inflation levels of an air bag cushion in response to rapid deceleration of a vehicle. An inflator releases gas to inflate an air bag cushion in response to one of a first and second deployment condition. The air bag cushion is in fluid communication with the inflator through a discharge port disposed in the inflator. A retainer disposed adjacent the inflator has a cavity in fluid communication with the inflator by a vent opening. The cavity provides fluid communication between the air bag cushion and exterior of the housing. A slide actuator assembly moves a slide from a first position to a second position in response to the first deployment condition. The first position permits a first predetermined level of fluid communication between the air bag cushion and the exterior of the air bag module. The second position permits a second predetermined level of fluid communication between the air bag cushion and the exterior of the air bag module. The first predetermined level of fluid communication is different than the second predetermined level.

Preferably, the cavity of the retainer is substantially annular about the inflator, and the vent opening is in registered relations with the discharge ports of the inflator. The slide actuator assembly includes a pyrotechnic initiator, a line disposed over the initiator and the slide, wherein the liner releasably retains and guides the slide upon firing of the initiator. Preferably, the inflator includes a plurality of discharge ports, wherein a portion of the ports are in registered relation with the vent opening of the retainer.

BRIEF DESCRIPTION OF THE DRAWINGS

The present invention will now be described, by way of example only, with reference to the accompanying drawings in which.

DESCRIPTION OF THE PREFERRED EMBODIMENT

Figure 1:
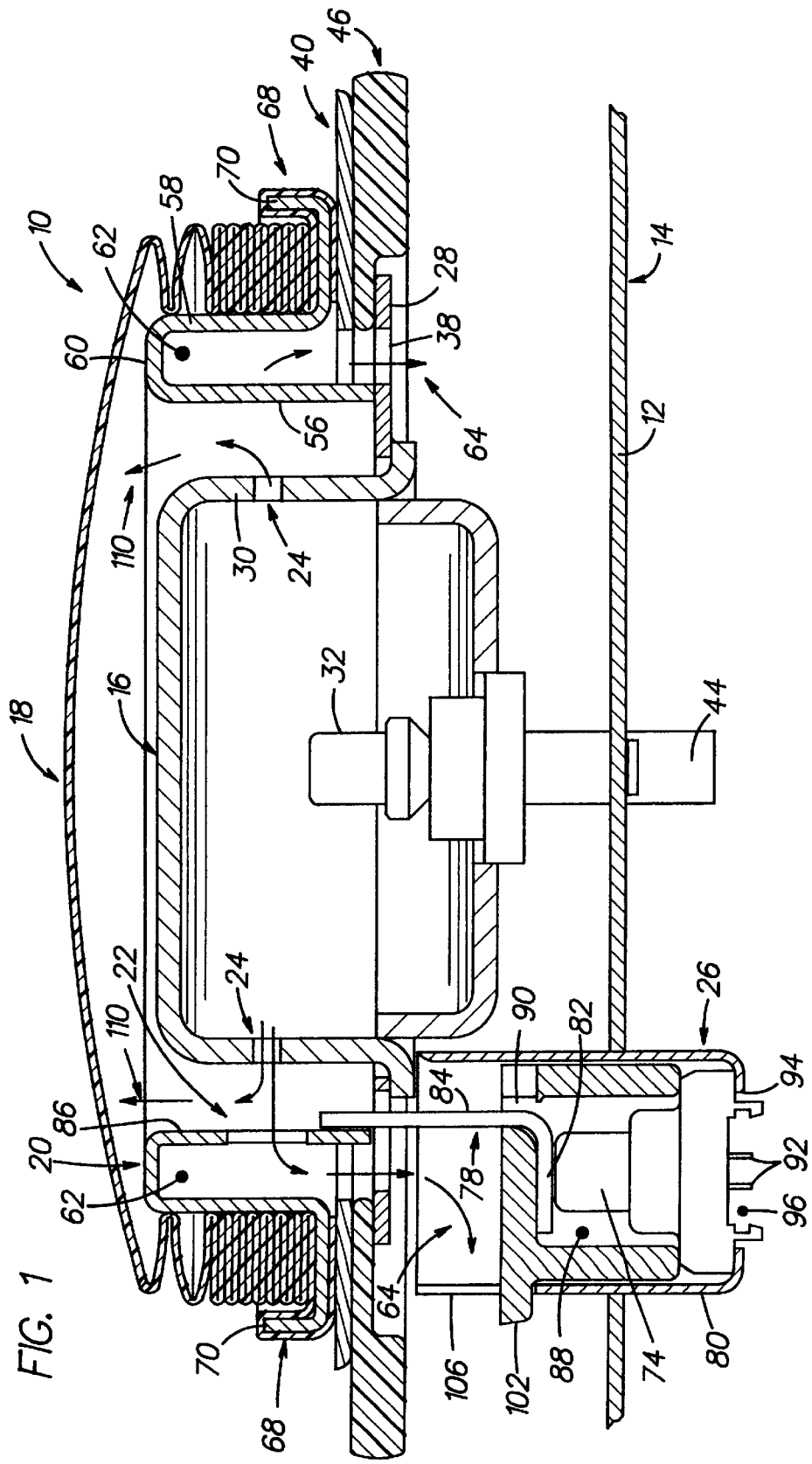
FIG. 1 is a sectional side view of a driver's side air bag module embodying the present invention shown during reduced level deployment of an air bag cushion.

Referring to FIG. 1, it is seen that an air bag module, generally designated 10, suitably mounted to a central hub 12 of a steering wheel 14. The air bag module includes an inflator 16 for generating inflator gas upon the sensing of predetermined vehicle conditions, i.e. rapid deceleration, to inflate an air bag cushion 18. An annular cushion retainer 20 is disposed about the inflator for directing gases from the inflator 16 to the air bag cushion 18. The cushion retainer 20 further includes a vent opening 22 to selectively direct gas away from the air bag cushion 18 during a reduced level of deployment. The inflator 16 shown is commonly used for an air bag module 10 installed in the driver side of a vehicle to protect the driver thereof. One skilled in the art, however, will recognize that the air bag module 10 described hereinafter may be used for other passive restraints, i.e., passenger side air bag modules and side impact air bag modules.

Upon actuation of the inflator 16 in response to fast deceleration of a motor vehicle, heated gas discharges from the inflator through ports 24 disposed in the inflator to inflate the air bag cushion 18. The inflator releases a predetermined volume of heated gas in response to the sensed deceleration of the vehicle. The output inflation of the inflator 16 is sufficient to fully deploy or inflate the air bag cushion 18.

A controller (not shown), e.g. a sensing and actuating system, generates an ignition signal to the inflator 16 in response to velocity responsive sensors (not shown) mounted on the vehicle bumper and/or acceleration, or inertia responsive sensors mounted on a part of the vehicle occupant compartment, such as the fire wall. In response to the sensed signals, the controller provides an ignition signal to the inflator 16 to initiate deployment inflation of the air bag cushion 18 in accordance with a predetermined level of deceleration. In response to the ignition signal, the inflator 16 releases an appropriate predetermined volume of gas into the air bag cushion 18 through the ports 24 of the inflator. The level of deployment of the air bag cushion 18 is dependent on the actuation of a slide actuator assembly 26 slidably arranged to selectively block the vent opening 22 of the cushion retainer 20 to restrict or prevent gas flow away from the air bag cushion, as will be described hereinafter.

As best shown in FIG. 1, the inflator 16 may be of any conventional construction for generating inflator gas to inflate the air bag cushion 18. Advantageously, the inflator 16 is preferably a single stage inflator which outputs inflator gas at a single level for inflating the air bag cushion. The inflator has a generally cylindrical body portion and a flange that suitably secures to an adapter plate 28. The inflator also includes a plurality of discharge ports 24, which are preferably positioned about the side wall 30. An initiator or pyrotechnic device 32 disposed within the inflator ignites pyrotechnic material which generates heated gas that discharges through the discharge ports 24 to inflate the air bag cushion 18.

Figure 3:
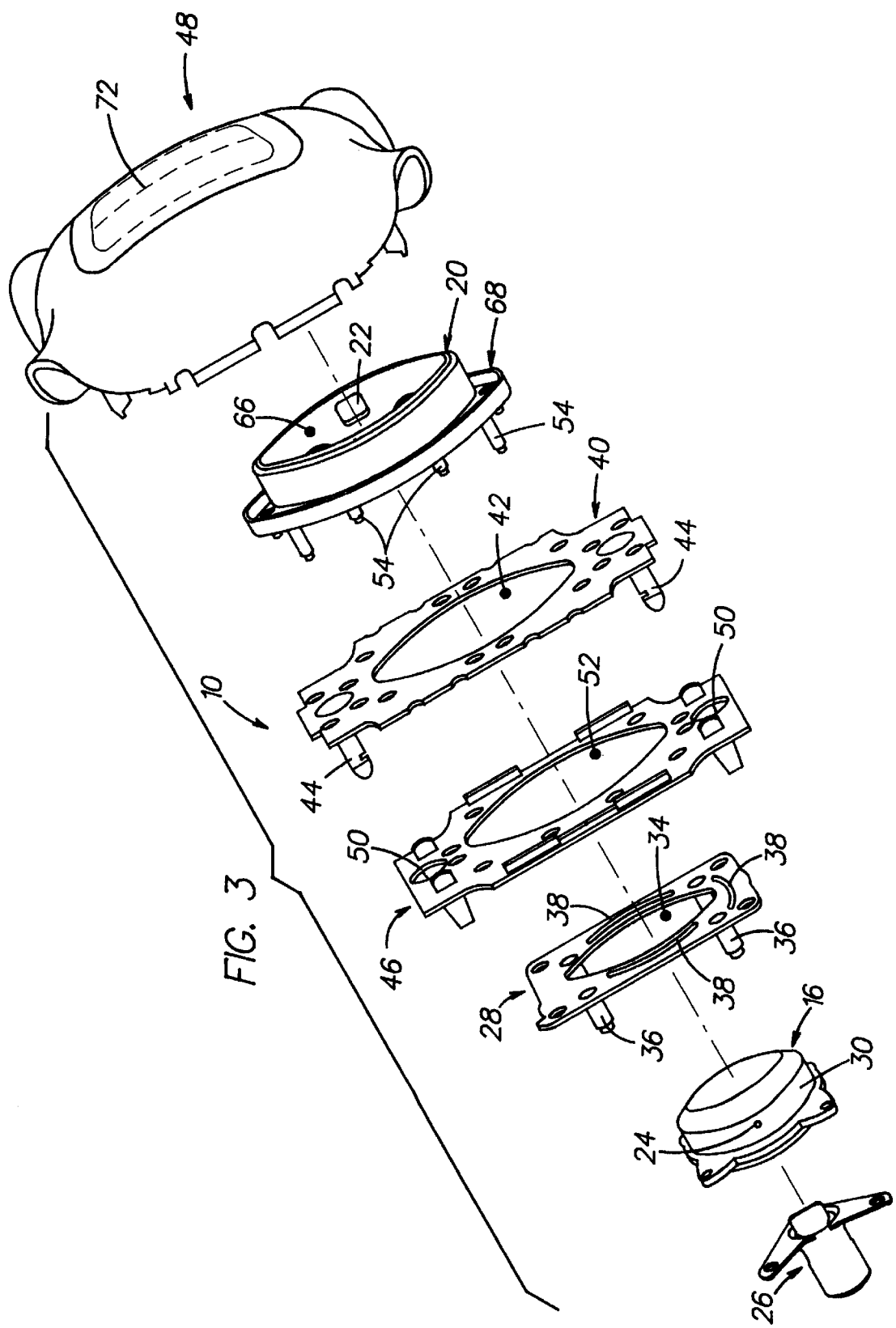
FIG. 3 is an exploded view of the driver's side air bag module of FIG. 1.

As shown in FIGS. 1 and 3, the adapter plate 28 supports both the inflator 16 and slide actuator assembly 26. The inflator is mounted within a central opening 34 of the adapter plate 28 by a plurality of threaded studs 36 extending from the bottom surface thereof. The slide actuator assembly 26 is also mounted to the studs 36 of adapter plate 28 adjacent the outer periphery of the inflator 16. The adapter plate has a plurality of arcuate slots 38 disposed about the central opening 34 which provide gas venting paths for directing inflator gas from the air bag cushion 18. The slide actuator assembly 26 is disposed below one of the arcuate slots 38 of the adapter plate 28 to permit the slide actuator assembly to extend through the arcuate slot during full level deployment of the air bag cushion, which will be described in greater detail hereinafter.

The air bag module 10 further includes an annular base plate 40, formed of a rigid material, having a central opening 42 for receiving the inflator 16 therethrough. A pair of studs 44 extends from the bottom surface of the base plate 40 to provide a snapfit connection to the hub 12 of the steering wheel 14. A pad retainer 46 is secured to the bottom surface of the base plate 40 to provide a means for securing an air bag cover or pad 48 to the base plate 40. The pad retainer 46 includes a pair of holes 50 in registered relations with the studs 44 to permit the studs to pass therethrough and secure to the hub 12 of the steering wheel 14. The pad retainer 46 includes a central opening 52 for receiving the inflator 16 to permit the inflator to extend into the air bag cushion 18.

The annular cushion retainer 20 is secured to the upper surface of the base plate 40 by a plurality of threaded studs 54 extending from the lower surface of the cushion retainer 20. The studs 54 extend through the base plate 40, the pad retainer 46 and the plate adapter 28 to thereby secure the cushion retainer, pad retainer, inflator and slide actuator assembly 26 to the base plate.

Figure 2:
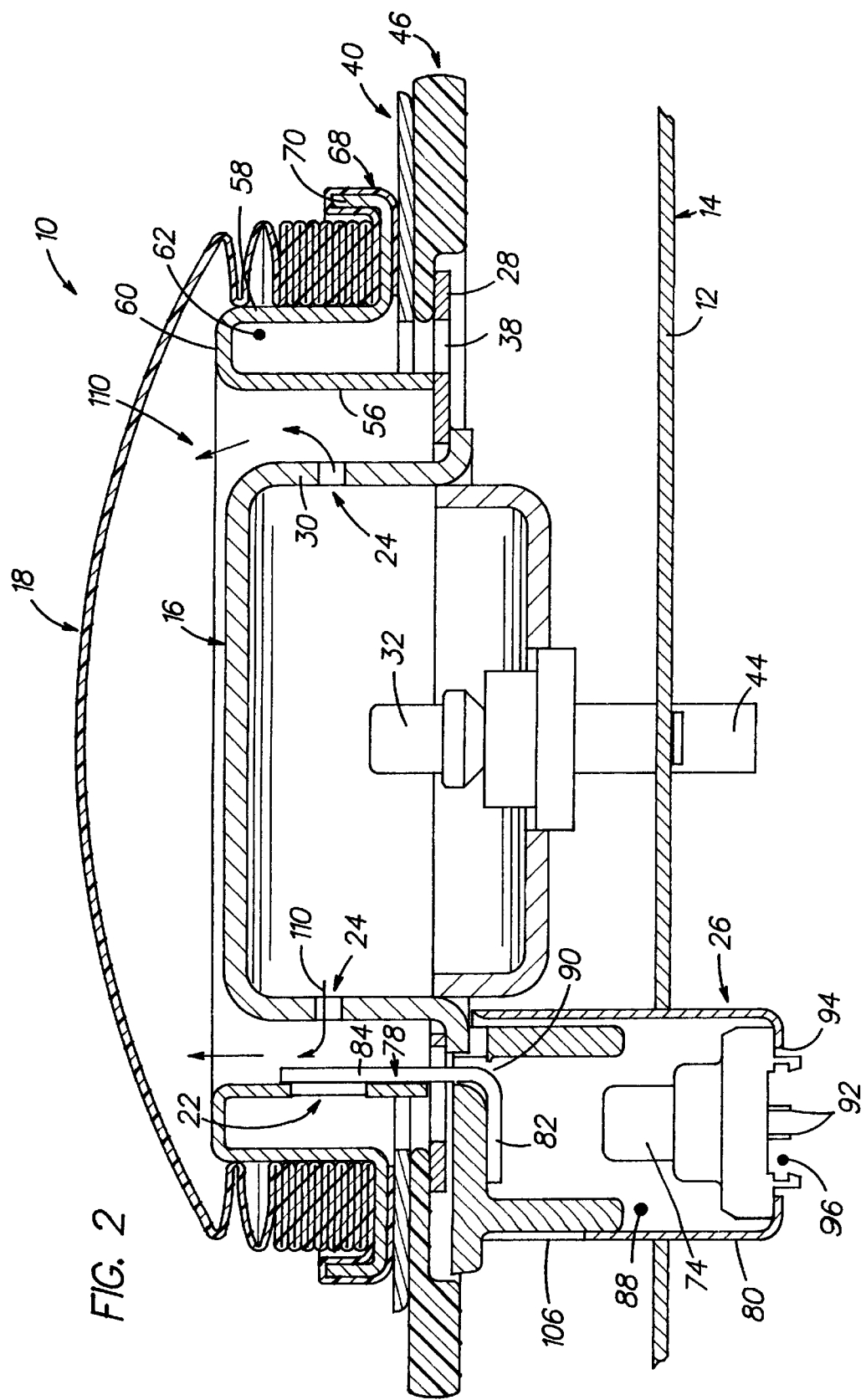
FIG. 2 is a sectional view of the driver's side air bag module of FIG. 1 shown during full level deployment of the air bag cushion.

As best shown in FIGS. 1–3, the cushion retainer 20 includes inner and outer vertical walls 56, 58 respectively, and an upper horizontal wall 60 that cooperatively define an annular cavity 62 opening downwardly towards the base plate 40. The inner vertical wall 56 extends downwardly through the central openings 42, 52 of the base plate 40 and pad retainer 46, respectively, to engage the adapter plate 28 to thereby define the exit paths 64. The inner vertical wall 56 also defines a central opening 66 for receiving the inflator 26 therein. The vent opening 22 of the cushion retainer 20 is disposed in the inner wall 56 which provides a path to direct a predetermined volume of gas released from the inflator 16 away from the air bag cushion 18 during reduced level deployment, as will be described hereinafter. Preferably, certain of the discharge ports 24 are generally aligned with the vent opening 22 of the cushion retainer 20.

An outer flange 68 extends from the outer vertical wall 58 of the cushion retainer 20 having an upward extending lip 70 about its outer periphery. The air bag cushion 18 is secured between the flange 68 and the base plate 40 to retain the air bag cushion 18 during deployment. When assembled, the upper horizontal wall 60 of the cushion retainer 20 extends above the discharge ports 24 of the inflator 16. To provide the venting path 64 for the inflator gas, the annular cavity 62 of the cushion retainer 20 is disposed in fluid communication with the arcuate slots 38 of the adapter plate 28.

The air bag cover or pad 48 fits over the base plate 40, cushion retainer 20 and air bag cushion 18, and fastens to the pad retainer 46. The cover 48 is preferably integrally molded of a single layer of plastic material and thus is relatively easy to manufacture. However, it will be appreciated that the cover could also be comprised of more than one layer and could include an outer decorative cover layer, such as a urethane foam material. The cover overlies the air bag cushion 18 and inflator 16 and maintains the air bag cushion in a folded condition prior to air bag deployment. As shown in FIG. 3, an exemplary tear pattern defined by edges 72 is shown. The edges define thinned sections of the air bag cover, which will tear during deployment of the air bag, as is well known in the art.

Figure 4:
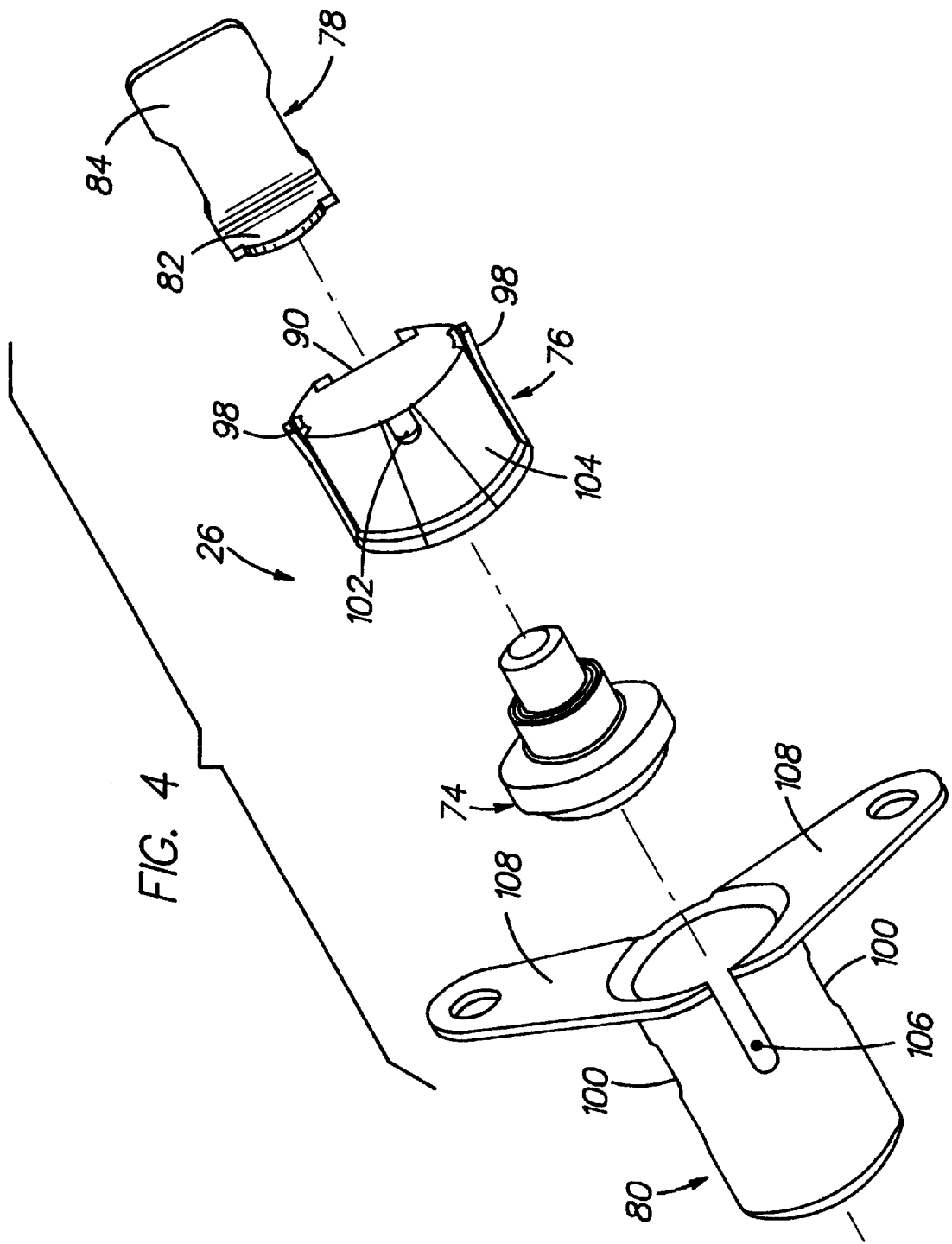
FIG. 4 is an exploded view of a slide actuator assembly of FIG. 1.

As best shown in FIG. 4, the slide actuator assembly 26 includes a pyrotechnic initiator 74, a liner 76 and a slide 78 disposed within a generally cylindrical housing 80. The slide 78, preferably formed of metal, is a generally L-shaped plate having a horizontal and vertical portion 82, 84 respectively. The horizontal portion 82 of the slide 78 engages the liner 76, and the vertical portion 84 extends upward through an arcuate slot 38 of the adapter plate 28 and central openings 52, 42 of the pad retainer 46 and base plate 40 respectively, and is disposed adjacent the inner surface 86 of the inner vertical wall 56 of the cushion retainer 20, as best shown in FIGS. 1 and 2. The width of the vertical portion 84 of the slide 78 is sufficient to cover the vent opening 22 of the cushion retainer 20 during full deployment of the air bag module 10.

The liner 76, formed preferably of a polymeric material, is substantially cylindrical having an inner cavity 88 that opens at the bottom surface thereof to receive the initiator 74. The liner includes a slot 90 in an upper portion thereof for receiving and retaining the horizontal portion 82 of the slide 78. Leads 92 extending from the initiator 74 extend through an opening 94 in the bottom of the housing 26 to permit interconnection with the controller (not shown). The initiator 74 includes a recess 96 for receiving and snapfitting thereto a connector (not shown) that interconnects the initiator and the controller. The liner 76 and slide 78 are releasably secured within the housing 80 by a pair of opposing spring tabs 98 disposed on the liner. The tabs 98 engage a pair of respective slots 100 in the housing 80, which is preferably formed of a metal material. The liner 76 further includes a guide tab 102 that extends from the side wall 104 of the liner which slidably engages a slot 106 disposed in the upper edge of the housing 80. The tab 102 guides the travel of and prevents rotation of the liner 76 and slide 78 upon firing of the initiator 74 during full deployment of the air bag cushion 18. The housing 80 includes a pair of flanges 108 for securing the slide actuator assembly 26 to the adapter plate, as described hereinbefore.

In the operation of the air bag module 10, the default or initial position of the slide 78 may be disposed in the retracted position as shown in FIG. 1 wherein the vent opening 22 of the cushion retainer 20 is open to permit gas flow from the inflator 16 to be directed away from the air bag cushion 18. Upon actuation of the air bag module 10 under full deployment conditions as shown in FIG. 2, controller actuates the pyrotechnic initiator 32 of the inflator 16 to ignite the pyrotechnic material to generate heated gas that discharges from the ports 24 of the inflator. Simultaneously, the controller fires the pyrotechnic initiator 74 of the slide actuator assembly 26, which propels the liner 76 and slide 78 upward, overcoming the retention force of the spring tabs 98 of the liner. The adapter plate 28 provides a stop for the travel of the slide 78 to properly position the slide over the vent opening 22 of the cushion retainer 20. When fully propelled, the slide blocks the vent opening of the cushion retainer and forces all the discharged gas from the inflator 16 along a first fluid flow path 110 into the air bag cushion 18.

Upon actuation of the air bag module 10 under reduced level deployment conditions, the controller does not fire pyrotechnic initiator 74 which maintains the slide 78 in the initial position as shown in FIG. 1 preventing the slide from restricting the vent opening 22 of the cushion retainer 20. The vent opening, therefore, provides a secondary path 64 for directing a predetermined amount of gas away from the air bag cushion 18, and thereby inflates the air bag cushion 18 at a reduced deployment level. As shown, the discharged gas flows from the inflator 16 to the air bag cushion along the first fluid flow path 110 to the air bag cushion. In addition, a portion of the discharged gas flows from the inflator 16 along the second fluid flow path 64. The second fluid flow path passes through the vent opening 22 to the annular cavity 62 of the cushion retainer 20. Once the gas within the annular cavity 62 pressurizes to a predetermined level, the gas passes through the central openings 42, 52 of the base plate 40 and pad retainer 46 respectively, disposed in fluid communication with the annular cavity. The pressurized discharge gas then passes through the arcuate slots 38 disposed in the adapter plate 28 and thereby exits the air bag module 10.

One skilled in the art will appreciate that the degree of reduced level of deployment of the air bag cushion 18 is dependent upon the volume of gas directed away from the air bag cushion. Therefore, one will appreciate that the cross-sectional area of the vent opening 22 of the cushion retainer 20, the annular cavity 62 of the cushion retainer, and arcuate slots 38 of the adapter plate 28 may be varied to achieve the desired reduced deployment. An increased cross-sectional area will result in a further reduced level of deployment. In addition, the level of reduced deployment, as well as the level of full deployment, may be varied by providing a time delay between the firing of the initiator 32 of the inflator 16 and the firing of the initiator 74 of the slide actuator assembly 26. For example, the reduced level of deployment may be increased by firing the initiator 74 of the slide actuator assembly 26 a predetermined time period after firing the initiator 32 of the inflator 16, which directs the gas away from the air bag cushion 18 for a shorter period of time.

One skilled in the art will appreciate that the default position of the slide 78 may be in the restricted position as shown in FIG. 2, wherein the pyrotechnic initiator 74 of the slide actuator assembly 26 is not ignited under full level deployment conditions. During reduced level deployment condition, the pyrotechnic initiator 74 is ignited to move the slide 78 downward from the cushion retainer 20 to the open, unrestricted position as shown in FIG. 1.

While the air bag module was described as having a separate base plate 40 and cushion retainer 20 having an annular cavity 62, one will appreciate that the cushion retainer may be combined with the base plate to form a single integral plate having the annular cavity and vent opening 22.

While the slide 78 is described as moving linearly to increase or reduce the level of inflation of the air bag cushion 18, one will appreciate that the slide may also pivot or rotate to control the level of inflation. Further, the initiator may also be any actuator, i.e., solenoid and plunger, that can propel the slide to close or open the vent opening 22 of the cushion retainer 20.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An air bag module for restraint of an occupant in a vehicle, the air bag module comprising:

an air bag cushion;

an inflator being activatable to discharge inflator gas for inflating the air bag cushion by a first fluid path, the inflator having at least one discharge port through which inflator gas is discharged;

a plate having a cavity disposed adjacent the inflator, wherein the cavity opens to the exterior of the air bag module, the plate having a vent opening to provide a second fluid path from the inflator through the cavity and the vent opening to the exterior of the air bag module for expelling inflator gas from the air bag module, wherein at least a portion of the inflator gas flowing according to the second fluid path is expelled from the air bag module without communicating with the air bag cushion, and an actuator assembly including a moveable member being movable relative to the vent opening for restricting fluid flow through the vent opening at a predetermined time during inflation of the air bag cushion to control the volume of inflator gas discharged into the air bag cushion and the volume of the inflator gas expelled out through the vent opening of the plate; and an actuator for moving the movable member at a predetermined time, wherein the movable member is disposed between the plate and the inflator so that movement of the movable member prevents fluid communication between the at least one discharge port and the vent opening, the at least one discharge port and the vent opening being at least partially in axial alignment with one another.

2. The air bag module, as in claim 1, wherein the actuator is a pyrotechnic device.

3. The air bag module, as in claim 1, wherein the actuator is capable of generating pressure for moving the member.

4. The air bag module, as in claim 1, wherein the predetermined time for moving the member is determined in response to a predetermined condition of the vehicle.

5. The air bag module, as in claim 1, wherein the movable member is positioned in a first position for closing the vent opening such that a substantial volume of inflator gas is discharged into the air bag cushion and wherein the movable member is movable to a second position for opening the vent opening at a predetermined time to decrease the volume of inflator gas discharged into the air bag cushion.

6. The air bag module, as in claim 1, wherein the movable member is positioned in a first position for opening the vent opening such that at least a portion of the inflator gas is expelled out through the vent opening and wherein the movable member is movable to a second position for closing the vent opening at a predetermined time to increase the amount of inflator gas discharged into the air bag cushion.

7. The air bag module, as in claim 1, wherein the movable member is movable between a first position in which the vent opening is entirely closed and a second position in which the vent opening is entirely open upon activation of the device.

8. The air bag module, as in claim 1, wherein the cavity is substantially annular.

9. The air bag module, as in claim 1, wherein the plate has an opening for receiving the inflator therein.

10. The air bag module, as in claim 1, wherein the plate is a cushion retainer for securing the air bag cushion to a base plate.

11. The air bag module, as in claim 1, wherein the plate is a base plate for securing the air bag module to the vehicle.

12. An air bag module for restraint of an occupant in a vehicle, the air bag module comprising:
   an air bag cushion;
   an inflator being activatable to discharge inflator gas for inflating the air bag cushion by a first fluid path, the inflator having at least one discharge port through which inflator gas is discharged;
   a plate having a cavity disposed adjacent the inflator, wherein the cavity opens to the exterior of the air bag module, the plate having a vent opening to provide a second fluid path between the inflator and the cavity to expel inflator gas from the air bag module, and
   an actuator assembly including a moveable member being movable relative to the vent opening for restricting fluid flow through the vent opening at a predetermined time during inflation of the air bag cushion to control the volume of inflator gas discharged into the air bag cushion and the volume of the inflator gas expelled out through the vent opening of the plate; and an actuator for moving the movable member at a predetermined time, wherein the actuator assembly includes a liner having a cavity for receiving the actuator and a slot for receiving the movable member.

13. The air bag module, as in claim 12, wherein the movable member closes the vent opening in the plate prior to activation of the actuator.

14. The air bag module, as in claim 12, wherein the movable member opens the vent opening in the plate prior to the activation of the actuator.

15. The air bag module, as in claim 12, wherein the movable member is movable between a first position in which the vent opening is entirely open and a second position in which the vent opening is entirely closed upon activation of the device.

16. An air bag module for restraint of an occupant in a vehicle, the air bag module comprising:
   an air bag cushion;
   an inflator being activatable to discharge inflator gas for inflating the air bag cushion by a first fluid path, the inflator having at least one discharge port through which inflator gas is discharged;
   a plate having a cavity disposed adjacent the inflator, wherein the cavity opens to the exterior of the air bag module, the plate having a vent opening to provide a second fluid path between the inflator and the cavity to expel inflator gas from the air bag module, and an actuator assembly including a moveable member being movable relative to the vent opening for restricting fluid flow through the vent opening at a predetermined time during inflation of the air bag cushion to control the volume of inflator gas discharged into the air bag cushion and the volume of the inflator gas expelled out through the vent opening of the plate; and an actuator for moving the movable member at a predetermined time, wherein the actuator assembly includes a housing for retaining the actuator, a liner and the movable member.

17. The air bag module, as defined in claim 1, wherein a liner includes a spring tab for releasable engaging a slot disposed in the housing.

18. The air bag module, as defined in claim 1, wherein the liner includes a guide tab extending from a wall of the liner, the spring tab disposed in sliding engagement with a guide slot of the housing.

19. An actuator assembly for an air bag module; the actuator assembly comprising:
   a movable member being movable relative to a vent opening of a plate for restricting fluid flow through the vent opening at a predetermined time during inflation of an air bag cushion to control the volume of inflator gas discharged into the air bag cushion and the volume of inflator gas expelled out through the vent opening of the plate;
   an actuator for moving the movable member at the predetermined time;
   a liner having a cavity for receiving the actuator and a slot for receiving a portion of the movable member; and
   a housing for receiving the actuator, the movable member and the liner.

20. The actuator assembly, as defined in claim 19, wherein the actuator is a pyrotechnic device.

21. The actuator assembly, as defined in claim 19, wherein the liner includes a spring tab for releasable engaging a slot disposed in the housing.

22. The actuator assembly, as defined in claim 19, wherein the liner includes a guide tab extending from a wall of the liner, the spring tab disposed in sliding engagement with a guide slot of the housing.

* * * * *